US010374901B2

(12) United States Patent
Ge et al.

(10) Patent No.: US 10,374,901 B2
(45) Date of Patent: Aug. 6, 2019

(54) METHOD AND APPARATUS FOR NODE TO DETERMINE TIME TO LIVE OF PATH

(71) Applicant: Samsung Electronics Co., Ltd., Suwon-si, Gyeonggi-do (KR)

(72) Inventors: Hong Li Ge, Xi'an (CN); Dong Xu, Xi'an (CN); Jin Zhang, Xi'an (CN); Ying Huang, Xi'an (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 362 days.

(21) Appl. No.: 15/399,171

(22) Filed: Jan. 5, 2017

(65) Prior Publication Data

US 2017/0331698 A1 Nov. 16, 2017

(30) Foreign Application Priority Data

May 12, 2016 (CN) .......................... 2016 1 0312694

(51) Int. Cl.

*G06F 15/173* (2006.01)
*H04L 12/24* (2006.01)
*H04L 12/841* (2013.01)
*H04L 12/26* (2006.01)

(52) U.S. Cl.

CPC ............ *H04L 41/12* (2013.01); *H04L 47/286* (2013.01); *H04L 43/08* (2013.01); *H04L 43/10* (2013.01)

(58) Field of Classification Search

CPC ....... H04L 41/12; H04L 47/286; H04L 43/08; H04L 43/10

See application file for complete search history.

(56) References Cited

U.S. PATENT DOCUMENTS 6,985,476 B1 * 1/2006 Elliott ..................... H04L 45/00 370/349
7,873,731 B1 * 1/2011 Leavy ................. H04L 63/1416 709/225
2008/0159163 A1 * 7/2008 Valli ....................... H04L 43/10 370/252

(Continued)

FOREIGN PATENT DOCUMENTS

CN 101932062 A 12/2010
CN 102143549 A 8/2011

(Continued)

*Primary Examiner* — Jonathan A Bui

(74) *Attorney, Agent, or Firm* — Harness, Dickey & Pierce, P.L.C.

(57) ABSTRACT

A method for determining time to live (TTL) of a path of a node including receiving a routing control packet, which includes a first link quality indicating a link quality of a path from the neighbor node to a source node transmitting the routing control packet, from a neighbor node of the node, acquiring a third link quality indicating a link quality of a path from the node to the source node according to a second link quality indicating a link quality of a path from the node to the neighbor node and the first link quality, and determining the TTL of the path from the node to the source node according to the third link quality may be provided. Accordingly, the TTL of the path can be determined more accurately according to a link quality of the path, thereby contributing to ensuring performance and stability of a routing algorithm.

20 Claims, 6 Drawing Sheets

(56) References Cited

U.S. PATENT DOCUMENTS

| | | | | |
|---|---|---|---|---|
| 2011/0176429 | A1* | 7/2011 | Johnsson | H04L 43/50 370/241 |
| 2011/0264795 | A1* | 10/2011 | Koide | H04L 43/0805 709/224 |
| 2012/0151032 | A1* | 6/2012 | Ciavattone | H04L 43/0811 709/224 |
| 2013/0315078 | A1* | 11/2013 | Brown | H04W 4/06 370/252 |
| 2016/0269245 | A1* | 9/2016 | Barnes | H04L 41/12 |

FOREIGN PATENT DOCUMENTS

| | | | |
|---|---|---|---|
| CN | 102186145 | A | 9/2011 |
| CN | 103297174 | A | 9/2013 |
| CN | 103888848 | A | 6/2014 |

* cited by examiner

METHOD AND APPARATUS FOR NODE TO DETERMINE TIME TO LIVE OF PATH

CROSS-REFERENCE TO RELATED APPLICATIONS

This application claims under 35 U.S.C. § 119 priority to Chinese Patent Application No. 201610312694.1, filed on May 12, 2016, in the State Intellectual Property Office of China (SIPO), the entire contents of which is incorporated herein by reference.

BACKGROUND

Technical Field

The present disclosure relates to methods and/or apparatuses for a node to determine time to live of a path.

Description of the Related Art

The term "time to live" refers to a time period or a mechanism that limits the lifespan or lifetime of data in a computer or network. In a design of a routing algorithm, time to live of a path is a key factor affecting a performance of the algorithm. If the time to live of the path is set to be too short, a frequent routing expiration may occur, thereby undesirably increasing routing maintenance cost and/or time delay of data transmission. If the time to live of the path is set to be too long, a data packet is still transmitted with an expired routing, thereby causing a higher packet loss rate and/or a longer time delay. Therefore, accurate time to live of the path can improve the performance of the routing algorithm.

In existing routing algorithms, methods for determining time to live of a path are mainly as follows:

I. Providing each path with the same time to live.

II. Determining time to live of a path by determining time to live values of respective links by predicting when a link between neighboring nodes will be disconnected based on geographical position information and movement speed information of respective nodes.

III. Setting time to live of a path based on energy states of a respective nodes in the path.

However, the existing methods for determining the time to live of the path as mentioned above have the following issues.

In the first method, properties of different links are not considered.

In the second method, the geographical position information and the movement speed information of the node should be obtained through a GPS or another method, and the obtained information should be added into a routing control packet. This method may be useful in a high-speed movement scenario. However, this method needs assistance of an additional mechanism (e.g., a GPS), and thus increases a cost of the routing control packet.

The third method is only applicable in a network (e.g., a wireless sensor network (WSN)) powered by a battery. this method is not applicable to a scenario where each node is supplied by a power source.

SUMMARY

Some example embodiments of the present disclosure are to provide methods and/or apparatuses for a node to determine time to live of a path, so as to determine time to live of a path more accurately.

According to an example embodiment, a method for determining time to live of a path of a target node may include receiving a routing control packet from a neighbor node of the target node, the routing control packet including a first link quality, the first link quality being a link quality of a path from the neighbor node to a source node, the source node being a node configured to transmit the routing control packet, acquiring a third link quality according to a second link quality and the first link quality, the second link quality being a link quality of a path from the target node to the neighbor node, the third link quality being a link quality of a path from the target node to the source node, determining the time to live of the path from the target node to the source node according to the third link quality, and performing routing of a wireless communication based on the determined time to live.

In some example embodiments, the method may further includes updating the first link quality in the routing control packet with the third link quality, and transmitting the updated routing control packet to another neighbor node of the target node.

In some example embodiments, the better the third link quality is, the longer the determined time to live may be, and the worse the third link quality is, the shorter the determined time to live may be.

In some example embodiments, the determining the time to live of the path may include determining the time to live of the path from the target node to the source node based on a product of the third link quality and a first time to live.

In some example embodiments, the method may further include updating the time to live of the path in a local routing table of the target node with the determined time to live.

In some example embodiments, the updating the time to live of the path may include comparing the determined time to live with a second time to live. When the determined time to live is greater than the second time to live, the time to live of the path in the local routing table of the target node may be updated with the determined time to live.

In some example embodiments, when the determined time to live is not greater than the second time to live, the time to live of the path in the local routing table of the target node may be updated with the second time to live.

In some example embodiments, the acquiring a third link quality may include acquiring the third link quality based on the second link quality and the first link quality through an operation.

In some example embodiments, the operation may include at least one of addition or multiplication.

In some example embodiments, the third link quality may be inversely proportional to a number of nodes included in the path from the target node to the source node.

According to an example embodiment, an apparatus determining time to live of a path of a target node may include a memory configured to store computer-readable instructions, and one or more processors configured to execute the computer-readable instructions such that the one or more processors are configured to receive a routing control packet from a neighbor node of the target node, the routing control packet including a first link quality, the first link quality being a link quality of a path from the neighbor node to a source node, the source node being a node configured to transmit the routing control packet, acquire a third link quality according to a second link quality and the first link quality, the second link quality being a link quality of a path from the target node to the neighbor node, the third link quality being a link quality of a path from the target node to the source node, determine the time to live of the path from the target node to the source node according to the third link quality, and performing routing of a wireless communication based on the determined time to live.

In some example embodiments, the one or more processors may be further configured to update the first link quality in the routing control packet with the third link quality, and transmit the updated routing control packet to another neighbor node of the target node.

In some example embodiments, the one or more processors may be further configured such that the better the third link quality is, the longer the determined time to live is, and the worse the third link quality is, the shorter the determined time to live is.

In some example embodiments, the one or more processors may be further configured to determine the time to live of the path from the target node to the source node based on a product of the third link quality and a first time to live.

In some example embodiments, the one or more processors may be further configured to update the time to live of the path in a local routing table of the target node into the determined time to live.

In some example embodiments, the one or more processors may be configured to update the time to live of the path by comparing the determined time to live with second time to live. When the determined time to live is greater than the second time to live, the one or more processors may be configured to update the time to live of the path in the local routing table of the node with the determined time to live.

In some example embodiments, when the determined time to live is not greater than the second time to live, the one or more processors may be configured to update the time to live of the path in the local routing table of the target node into the second time to live.

In some example embodiments, the one or more processors may be configured to acquire the third link quality based on the second link quality and the first link quality through an operation.

In some example embodiments, the operation may include at least one of addition or multiplication.

In some example embodiments, the one or more processors may be configured to acquire the third link quality such that the third link quality is inversely proportional to a number of nodes included in the path from the target node to the source node According to an example embodiment, a method for performing routing of a wireless communication may include receiving a routing control packet from a neighbor node of a target node, the routing control packet including a first link quality, the first link quality being a link quality of a path from the neighbor node to a source node, the source node being a node configured to transmit the routing control packet, acquiring a third link quality according to a second link quality and the first link quality, the second link quality being a link quality of a path from the target node to the neighbor node, the third link quality being a link quality of a path from the target node to the source node, and determining a time to live of the path from the target node to the source node according to the third link quality based on a product of the third link quality and a first threshold time to live

BRIEF DESCRIPTION OF THE DRAWINGS

The above and other purposes, features and advantages of example embodiments of the present disclosure will become apparent from the following detailed description of some example embodiments taken in conjunction with the accompanying drawings in which.

DETAILED DESCRIPTION

Example embodiments will now be described more sufficiently with reference to the accompanying drawings, in which some example embodiments are illustrated.

Figure 1:
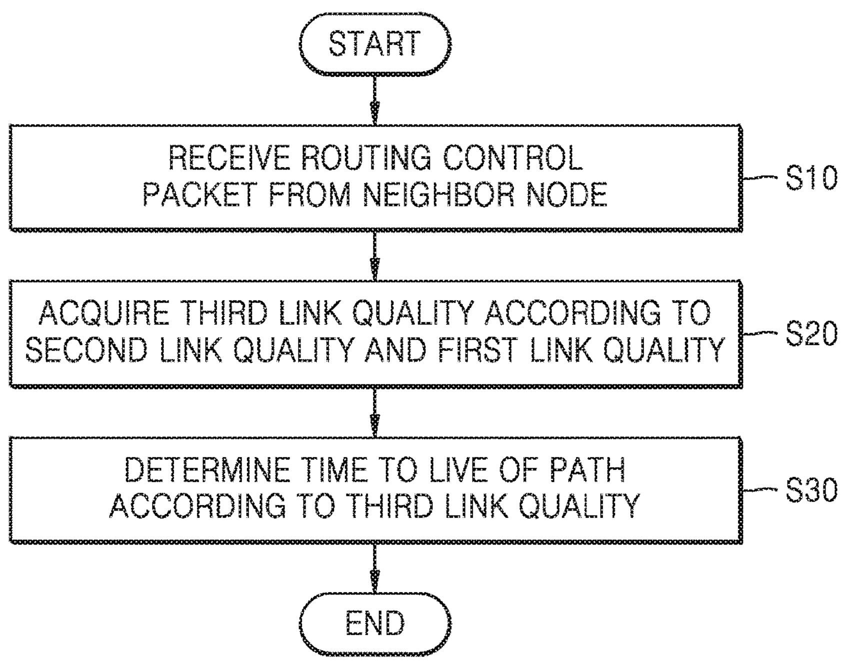
FIG. 1 illustrates a flowchart of a method for a node to determine time to live of a path according to an example embodiment of the present disclosure.

FIG. 1 illustrates a flowchart of a method for a node to determine time to live of a path according to an example embodiment of the present disclosure. Here, the term "node" refers to an arbitrary node in a routing link network, and each node in the routing link network can determine time to live of a path, according to a received routing control packet and in accordance with the method as shown in FIG. 1.

Referring to FIG. 1, in step S10, a routing control packet is received from a neighbor node of a node. Here, the routing control packet may include a first link quality, and the first link quality may indicate a link quality of a path from the neighbor node to a source node transmitting the routing control packet. The routing control packet received from the neighbor node may have various types as long as the routing control packet is capable of carrying a link quality, and the node may be associated with one or more neighbor nodes.

Here, the neighbor node in step S10 indicates a neighbor node transmitting a routing control packet to the node. In addition, the source node transmitting the routing control packet indicates a node initially initiating the routing control packet in a routing link network.

Here, a source node for transmitting a routing control packet can initiate a routing control packet at a desired (or alternatively, predetermined) time interval, or initiate a routing control packet only when transmitting a data packet through a path is desired so as to determine time to live of the path.

In step S20, a third link quality is acquired according to a second link quality acquired by the node and a first link quality included in the received routing control packet.

Here, a second link quality may indicate a link quality of a path from the node to the neighbor node, and a third link quality can indicate a link quality of a path from the node to a source node transmitting the routing control packet.

For example, a step in which the node acquires the third link quality may include obtaining the third link quality of the node based on the second link quality and the first link quality through a desired (or alternatively, predetermined) operation. Here, the desired (or alternatively, predetermined) operation may be performed by various existing calculation methods which can acquire a link quality. For example, the desired (or alternatively, predetermined) operation may include, but not limited to, addition or multiplication.

The number of nodes included in the path from the node to the source node transmitting the routing control packet may affect the third link quality. For example, the third link quality can be inversely proportional to the number of nodes included in the path from the node to the source node transmitting the routing control packet. That is, the larger the number of nodes included in the path is, the worse the link quality corresponding to the path is, and the less the number of nodes included in the path is, the better link quality corresponding to the path is.

Further, the step S20 may further include a step of acquiring the second link quality.

Here, a link quality between an arbitrary neighbor second hop node and the node can be acquired through various existing methods. As an example, a link quality between the arbitrary neighbor second hop node and the node can be acquired based on a neighbor state packet (i.e. a HELLO packet) and an acknowledgment packet (i.e. an ACK packet) transmitted between the arbitrary neighbor second hop nodes.

Here, a procedure of acquiring a link quality of a path from the node to a neighbor node of the node based on the HELLO packet and the ACK packet is described in detail below with reference to FIG. 2.

Figure 2:
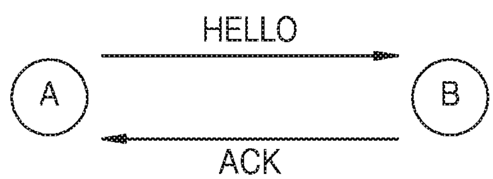
FIG. 2 illustrates a diagram of acquiring a link quality of a path from a node to a neighbor node of the node based on a HELLO packet and an ACK packet according to an example embodiment of the present disclosure.

FIG. 2 illustrates a diagram of acquiring the link quality of the path from the node to the neighbor node of the node based on the HELLO packet and the ACK packet according to an example embodiment of the present disclosure.

As shown in FIG. 2, each node included in a route link network may have a slide time window, each node may transmit a HELLO packet periodically, a node receiving the HELLO packet may echo an ACK packet to a node transmitting the HELLO packet, and a link quality of a path from a node to a neighbor node of the node may be calculated indirectly by counting the number of the HELLO packets and the number of the ACK packets received from the neighbor node within the slide time window.

For example, in an example as shown in FIG. 2, a node A and a node B are neighbor nodes, and generally a link quality from the node A to the node B and a link quality from the node B to the node A are different. Taking FIG. 2 as an example, a procedure in which the node A acquires a link quality from the node A to the node B is introduced. HELLO represents a HELLO packet transmitted from the node A to the node B, and the number of the HELLO packets transmitted from a node A to a node B (e.g., the number of the HELLO packets transmitted within the slide time window) can be marked as "$N_A$". ACK represents an ACK packet transmitted from the node B to the node A, and the number of the ACK packets transmitted from the node B to the node A (e.g., the number of the ACK packets received by the node A and echoed by the node B within the slide time window, wherein the number is counted by the node A) can be marked as "ACK".

For example, a link quality from the node B to the node A can be acquired based on the number of the received HELLO packets transmitted by the node B, and the number of the HELLO packets transmitted from the node B to the node A and echoed by the node A within the slide time window, wherein the numbers are counted by a node B. For example, a ratio between the number of the received HELLO packets transmitted by the node B and the number of the HELLO packets transmitted from the node B to the node A can be taken as the link quality from the node B to the node A, wherein the numbers are counted by the node B.

Here, the periods for the respective nodes to transmit the HELLO packets in a general routing link network are identical. That is, the node A knows a period for the node B to transmit the HELLO packet. Therefore, the node A can learn the number of the HELLO packets actually transmitted by the node B to the node A within a slide time window (e.g., a desired (or alternatively, predetermined) time period). As an example, the link quality from the node B to the node A can be calculated by using the following formula:

$$RQ = \frac{RHello}{N_B} \tag{1}$$

In the formula (1), RQ represents to the link quality from the node B to the node A, RHello represents to the number of the received HELLO packets transmitted by the node B and counted by the node A within the slide time window, and $N_B$ represents to the number of the HELLO packets transmitted from the node B to the node A.

Further, an echo quality from the node B to the node A can also be acquired based on the number of ACK packets echoed by the node B and received by the node A and the number of HELLO packets transmitted from the node A to the node B within a slide time window, wherein the numbers are counted by the node A. For example, a ratio between the number of the ACK packets echoed by the node B and received by the node A and the number of the HELLO packets transmitted from the node A to the node B within the slide time window can be taken as the echo quality from the node B to the node A, wherein the numbers are counted by the node A. As an example, the echo quality from the node B to the node A can be calculated by using the following formula:

$$EQ = \frac{ACK}{N_A} \tag{2}$$

In the formula (2), EQ represents the echo quality from the node B to the node A, ACK represents the number of the ACK packets transmitted from the node B to the node A and received by the node A, and $N_A$ represents the number of the HELLO packets transmitted from the node A to the node B.

Further, a link quality from the node A to the node B can also be acquired based on the echo quality from the node B to the node A and the link quality from the node B to the node A. For example, a ratio between the echo quality from the node B to the node A and the link quality from the node B to the node A can be taken as the link quality from the node A to the node B. As an example, the link quality from the node A to the node B can be calculated by using the following formula:

$$LQ = \frac{EQ}{RQ} \tag{3}$$

In the formula (3), LQ represents the link quality from the node A to the node B, EQ represents the echo quality from the node B to the node A, and RQ represents the link quality from the node B to the node A.

FIG. 2 illustrates an example of a procedure of acquiring a second link quality (e.g., acquiring a link quality from a node to a neighbor node of the node), and the present disclosure is not limited thereto.

Returning to FIG. 1, in step S30, time to live of a path from the node to a source node transmitting the routing control packet is determined according to the third link quality. As an example, the better the third link quality is, the longer the determined time to live is, and the worse the third link quality is, the shorter the determined time to live is.

For example, a step of determining the time to live of the path may determine the time to live of the path from the node to the source node transmitting the routing control packet based on a product of the third link quality and a first desired (or alternatively, predetermined or threshold) time to live. As an example, the first desired (or alternatively, predetermined or threshold) time to live may be empirically set by those skilled in the art.

After the time to live of the path from the node to the source node transmitting the routing control packet is determined by the node, the received routing control packet can be updated based on the third link quality and the updated routing control packet can be forwarded.

In some example embodiments, a step of updating the received routing control packet based on the third link quality and forwarding the updated routing control packet can include updating the first link quality in the routing control packet with the third link quality, and transmitting the updated routing control packet to another neighbor node of the node so that the other neighbor node can determine time to live of a path from the arbitrary node to the source node transmitting the routing control packet based on the received routing control packet.

In some example embodiments, the node may include a local routing table, and a method for a node to determine time to live of a path may further include updating time to live of a path in the local routing table of the node into the determined time to live.

A step of updating time to live of a path in a local routing table of a node is described in detail below with reference to FIG. 3.

Figure 3:
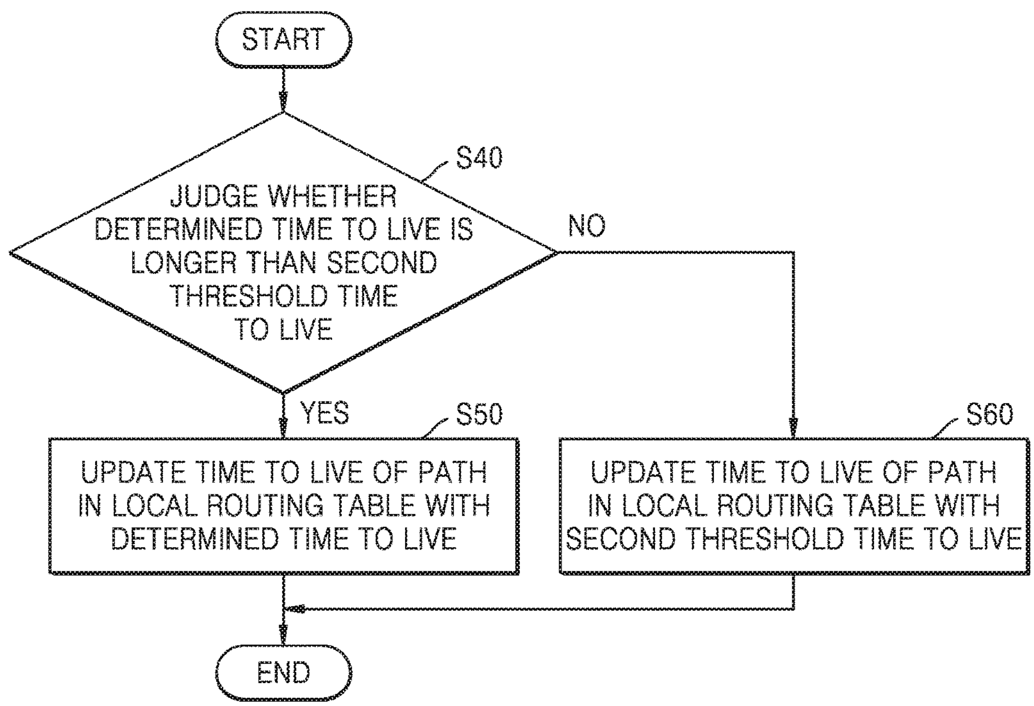
FIG. 3 illustrates a flowchart of a step of updating time to live of a path in a local routing table of a node according to an example embodiment of the present disclosure.

FIG. 3 illustrates a flowchart of a step of updating time to live of a path in a local routing table of a node according to an example embodiment of the present disclosure.

Referring to FIG. 3, in step S40, the determined time to live may be compared with second desired (or alternatively, predetermined or threshold) time to live. In other words, whether the determined time to live is longer than the second desired (or alternatively, predetermined or threshold) time to live may be judged.

When the determined time to live is greater than the second desired (or alternatively, predetermined or threshold) time to live, then step S50 of updating the time to live of the path in the local routing table of the node with the determined time to liv may be executed.

When the determined time to live is not greater than (i.e. smaller than or equal to) the second desired (or alternatively, predetermined or threshold) time to live, then step S60 of updating the time to live of the path in the local routing table of the node with the second desired (or alternatively, predetermined or threshold) time to live may be executed.

Here, the local routing table of the node may not only include the time to live of the path, but also include the path corresponding to the determined time to live of the path (e.g., the path from the node to the source node transmitting the routing control packet).

The routing link network may include, for example, a link state routing mode and a distance vector routing mode. In the link state routing mode, a node knows all the nodes on the path from the node to the source node transmitting the routing control packet. In the distance vector routing mode, a node does not know all the nodes on the path from the node to the source node transmitting the routing control packet, instead the node only knows a next hop node in the path from the node to the source node transmitting the routing control packet.

With respect to characteristics of the above two route modes, paths from the node to the source node transmitting the routing control packet, which is included in the local routing table of the node, may be different.

In one example, with respect to the link state routing mode, the local routing table of the node may not only include the time to live of the path, but also include a path table. As an example, the path table can be used to record the path from the node to the source node transmitting the routing control packet. The path table stores all the nodes on the path from the node to the source node transmitting the routing control packet.

In this case, the routing control packet not only includes the first link quality, but also a routing table, and the routing table is used to record a path from the neighbor node to the source node transmitting the routing control packet. Accordingly, and a method for a node to determine time to live of a path according to some example embodiments of the present disclosure may further include a step of acquiring a path from the node to the source node transmitting the routing control packet.

For example, the step of acquiring the path from the node to the source node transmitting the routing control packet may include after receiving the routing control packet from the neighbor node, adding the node into the routing table so as to acquire the path from the node to the source node transmitting the routing control packet, and then storing the acquired path into the path table of the local routing table of the node.

In another example, with respect to the distance vector routing mode, the local routing table of the node may not only include the time to live of the path, but also include a next hop node from the node to the source node transmitting the routing control packet.

In this case, a method for a node to determine time to live of a path according to an example embodiment of the present disclosure may further include a step of determining a next hop node in the path from the node to the source node transmitting the routing control packet.

For example, the step of determining the next hop node in the path from the node to the source node transmitting the routing control packet may include after receiving the routing control packet from the neighbor node, the neighbor node is taken as the next hop node in the path from the node to the source node transmitting the routing control packet, and is added into the local routing table of the node.

Here, a procedure of storing determined time to live of a path and the path corresponding to the determined time to live of the path into a local routing table of a node is described with reference to FIG. 4.

Figure 4:
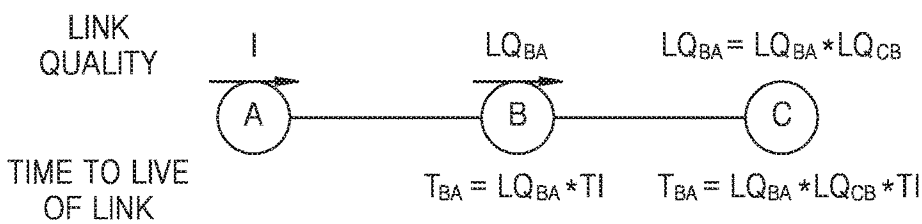
FIG. 4 illustrates a diagram of updating to a local routing table of a node according to an example embodiment of the present disclosure.

FIG. 4 illustrates a diagram of updating to a local routing table of a node according to an example embodiment of the present disclosure.

In FIG. 4, a node A is a source node transmitting a routing control packet, a node B is a neighbor node of the node A, and a node C is a neighbor node of the node B. In FIG. 4, a direction indicated by an arrow is a transmission direction of the routing control packet. An upper part in FIG. 4 illustrates a link quality of a path from a respective node to the source node transmitting the routing control packet, wherein the link quality is counted by the respective node. A lower part in FIG. 4 illustrates the time to live of the path from the respective node to the source node transmitting the routing control packet, wherein the time to live is determined by the respective node.

Referring to FIG. 4, in the link state routing mode, the node A initiates the routing control packet. That is, the node A transmits the routing control packet to a neighbor node, for example, the node A, first, wherein the routing control packet includes a link quality of a path from the node A to the source node (namely, the node A) transmitting the routing control packet, and thus the link quality from the node A to the node A is 1). After receiving the routing control packet from the node A, the node B determines a link quality $LQ_{BA}$ from the node B to the node A based on the received routing control packet (e.g., by the formula of $LQ_{BA}=1\times LQ_{BA}$), determines time to live $T_{BA}$ of a path from the node B to the node A according to the link quality $LQ_{BA}$ of the path from the node B to the node A (e.g., by the formula of $T_{BA}=1\times LQ_{BA}\times T_1$, wherein $T_1$ is first determined time to live), and stores the determined time to live $T_{BA}$ of the path from the node B to the node A into a local routing table of the node B. Further, the node B can also be added into the routing control packet so as to acquire the path (B→A) from the node B to the node A, and the acquired path (B→A) from the node B to the node A can also be stored in the local routing table of the node B.

Thus, the local routing table of the node B may store information as shown in Table 1 below.

TABLE 1

| PATH | TIME TO LIVE |
|---|---|
| B→A | $T_{BA}$ $(1 \times LQ_{BA} \times T_1)$ |

Referring to Table 1, a desired (or alternatively, predetermined) operation for acquiring a link quality is multiplication, 1 represents the link quality from a node A to the node A, $LQ_{BA}$ represents a link quality from the node B to the node A, and $T_1$ represents first determined time to live.

After the time to live of the path from the node B to the node A is determined, the link quality from the node A to the node A in the routing control packet may be updated with the link quality $LQ_{BA}$ from the node B to the node A, and the updated routing control packet may be transmitted to a neighbor node of the node B.

Similarly, after a node C receives the routing control packet from the node B, time to live $T_{CA}$ of a path from the node C to the node A may be determined in accordance with the above procedure (by the formula of $T_{CA}=1\times LQ_{BA}\times LQ_{CB}\times T_1$), and the determined time to live $T_{CA}$ of the path from the node C to the node A may be stored into a local routing table of the node C, and the path (C→A) from the node C to the node A is also may be stored in the local routing table of the node C.

In some example embodiments, the routing control packet can also be initiated by the node B. At this time, the node B is the source node transmitting the routing control packet. In this case, after the node C receives the routing control packet from the node B, time to live $T_{CB}$ of a path from the node C to the node B is determined in accordance with the above procedure, and the determined time to live $T_{CB}$ of the path from the node C to the node B is stored into a local routing table of the node C, and the path (C→B) from the node C to the node B is also stored in the local routing table of the node C.

Thus, the local routing table of the node C may store information as shown in Table 2 below.

TABLE 2

| PATH | TIME TO LIVE |
|---|---|
| C→A | $T_{CA}$ $(1 \times LQ_{BA} \times LQ_{CB} \times T_1)$ |
| C→B | $T_{CB}$ $(1 \times LQ_{CB} \times T_1)$ |

Referring to Table 2, the desired (or alternatively, predetermined) operation for acquiring the link quality is multiplication, 1 represents the link quality from the node A to the node A, $LQ_{BA}$ represents a link quality from the node B to a node A, $LQ_{CB}$ represents a link quality of the path from the node C to the node B, and $T_1$ represents the first determined time to live.

Because each node included in a routing link network can be a source node transmitting a routing control packet, a local routing table of a respective node can store a path from the respective node to an arbitrary node in the routing link network and time to live of the path. For example, with respect to the example mentioned above, the local routing table of the node B may not only store the path from the node B to the node A and the corresponding time to live of the path, but also store a path from the node B to the node C and corresponding time to live of the path (in the case that the node C is the source node transmitting the routing control packet). Accordingly, a local routing table of the node A may not only store a path from the node A to the node C and corresponding time to live of the path, but also store a path from the node A to the node B and corresponding time to live of the path, although not every possible scenario has been individually described in the present disclosure.

After the respective nodes included in the routing link network update the respective local routing tables, a data packet may be transmitted based on the routing link network. An arbitrary node may include a timer, and the timer included in the arbitrary node may be reset when time to live of a path from the node to a source node transmitting a data packet is updated. For example, when the node receives a data packet from a neighbor node of the node and is ready to transmit the data packet, whether the timer has reached the time to live first may be checked. If the timer reaches the time to live, then the path (e.g., the path from the node to the source node transmitting the data packet) may be expired, and thus the path may not be used to transmit the data packet. If the timer does not reach the time to live, the timer may be reset (e.g., restarting timing of the timer) and the path may be used to transmit the data packet.

Here, a procedure of transmitting, to a destination node, a data packet from a source node transmitting the data packet is described below with reference to FIG. 5.

Figure 5:
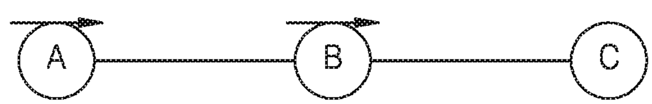
FIG. 5 illustrates a diagram of transmitting a data packet from a source node transmitting the data packet to a destination node according to an example embodiment of the present disclosure.

FIG. 5 illustrates a diagram of transmitting a data packet from a source node transmitting the data packet to a destination node according to an example embodiment of the present disclosure.

Referring to FIG. 5, a node A is a source node transmitting a data packet, a node B is a neighbor node of the node A, and a node C is a neighbor node of the node B. In FIG. 5, a direction indicated by an arrow is a transmission direction of the data packet.

For example, the node A may include a timer, and when the node A starts to transmit the data packet, the node A knows a destination node of the transmitted data packet (e.g., the node C). When the node A starts to transmit the data packet, the timer of the node A starts to operate, and when a time of the timer reaches time to live (e.g., time to live of a path from the node A to the node C), the path from the node A to the node C may be expired.

Similarly, the node B may include a timer, and when the node B receives the data packet from the node A, the node B knows the destination node (e.g., the node C) of the data packet transmitted by the node A. At this time, the timer of the node B starts to operate, and when a time of the timer reaches time to live e.g., time to live of a path from the node B to the node C), the path from the node B to the node C may be expired.

Thus, a local routing table of the node A may store information as shown in Table 3 below.

TABLE 3

| PATH | TIME TO LIVE |
|---|---|
| A→C | $T_{AC}$ (1 × $LQ_{AB}$ × $LQ_{BC}$ × $T_1$) |

Further, a local routing table of the node B may store information as shown in Table 4 below.

TABLE 4

| PATH | TIME TO LIVE |
|---|---|
| B→C | $T_{BC}$ (1 × $LQ_{BC}$ × $T_1$) |

Figure 6:
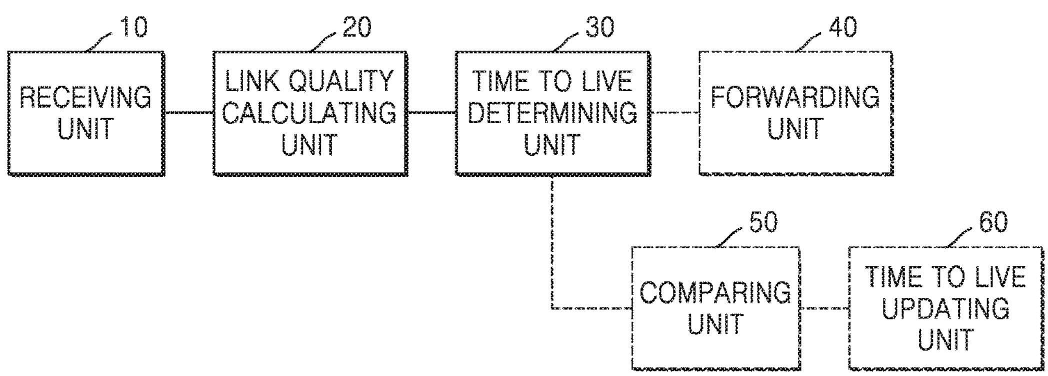
FIG. 6 illustrates a block diagram of an apparatus for a node to determine time to live of a path according to an example embodiment of the present disclosure.

FIG. 6 illustrates a block diagram of an apparatus for a node to determine time to live of a path according to an example embodiment of the present disclosure.

As shown in FIG. 6, an apparatus for a node to determine time to live of a path according to an example embodiment of the present disclosure may include a receiving unit 10, a link quality calculating unit 20, and a time to live determining unit 30. The apparatus for the node to determine the time to live of the path according to the example embodiment of the present disclosure may further include a forwarding unit 40, a comparing unit 50, and a time to live updating unit 60.

For example, the receiving unit 10 may receive a routing control packet from a neighbor node of the node. Here, the routing control packet may include a first link quality, and the first link quality may indicate a link quality of a path from the neighbor node to a source node transmitting the routing control packet. The node may have one or more neighbor nodes. Here, the neighbor node indicates a node transmitting the routing control packet to the node. Further, the source node transmitting the routing control packet indicates a node initially initiating the routing control packet in a routing link network.

Here, the source node transmitting the routing control packet may initiate the routing control packet at a desired (or alternatively, predetermined) time interval, or initiate the routing control packet only when transmitting a data packet through a path is desired so as to determine time to live of the path.

The link quality calculating unit 20 may acquire a third link quality according to an acquired second link quality and the first link quality included in the routing control packet received by the receiving unit 10. Here, the second link quality can indicate a link quality of a path from the node to the neighbor node, and the third link quality can indicate a link quality of a path from the node to the source node transmitting the routing control packet.

For example, the link quality calculating unit 20 may acquire the third link quality based on the second link quality and the first link quality through a desired (or alternatively, predetermined) operation. Here, the desired (or alternatively, predetermined) operation may be at least one of various existing calculation methods which can acquire a link quality. As an example, the desired (or alternatively, predetermined) operation may include, but not limited to, addition or multiplication.

Here, the number of nodes included in the path from the node to the source node transmitting the routing control packet may affect the third link quality. For example, the third link quality may be inversely proportional to the number of nodes included in the path from the node to the source node transmitting the routing control packet. That is, the larger the number of nodes included in a path, the worse a link quality corresponding to the path is, and the less the number of nodes included in a path is, the better a link quality corresponding to the path is.

Further, the apparatus for the node to determine the time to live of the path according to the example embodiment of the present disclosure may further include an acquiring unit (not shown) configured to acquire the second link quality. Here, a link quality between arbitrary neighbor second hop nodes may be acquired through various existing devices. As an example, the acquiring unit may acquire the link quality between the arbitrary neighbor second hop nodes based on a neighbor state packet (e.g., a HELLO packet) and an acknowledgment packet (e.g., an AKC packet) transmitted between the arbitrary neighbor second hop nodes.

Because the procedure for the acquiring unit to acquire the second link quality has been described in detail above in FIG. 2, the description is not repeated The time to live determining unit 30 may determine the time to live of the path from the node to the source node transmitting the routing control packet according to the third link quality. As an example, the better the third link quality is, the longer the determined time to live is, and the worse the third link quality is, the shorter the determined time to live is.

For example, the time to live determining unit 30 may determine the time to live of the path from the node to the source node transmitting the routing control packet according to a product of the third link quality and first desired (or alternatively, predetermined or threshold) time to live. As an example, the first desired (or alternatively, predetermined or threshold) time to live can be empirically set by those skilled in the art.

After the time to live determining unit 30 determines the time to live of the path from the node to the source node transmitting the routing control packet, the forwarding unit 40 may update the received routing control packet based on the third link quality, and forward the updated routing control packet.

For example, the forwarding unit 40 may update the first link quality in the routing control packet with the third link quality, and transmit the updated routing control packet to other neighbor nodes of the node than the neighbor node so that arbitrary nodes of the other neighbor nodes may determine time to live values of a path from the arbitrary nodes to the source node transmitting the routing control packet based on the received routing control packet.

In some example embodiments of the present disclosure, the node may include a local routing table, and the time to live updating unit 60 may update time to live of a path in the local routing table of the node with the determined time to live.

For example, the comparing unit 50 may compare the determined time to live with second desired (or alternatively, predetermined or threshold) time to live, namely judge whether the determined time to live is longer than the second desired (or alternatively, predetermined or threshold) time to live.

The time to live updating unit 60 may update the time to live of the path in the local routing table of the node with the determined time to live, when the determined time to live is greater than the second desired (or alternatively, predetermined or threshold) time to live.

When the determined time to live is not greater than (i.e. shorter than or equal to) the second desired (or alternatively, predetermined or threshold) time to live, the time to live updating unit 60 updates the time to live of the path in the local routing table of the node with the second desired (or alternatively, predetermined or threshold) time to live.

Here, the local routing table of the node may not only include the time to live of the path, but also include a path (e.g., the path from the node to the source node transmitting the routing control packet) corresponding to the determined time to live of the path.

According to some example embodiments, an apparatus for a node to determine time to live of a path may include a memory configured to store computer-readable instructions, and one or more processors configured to execute the computer-readable instructions such that the one or more processors are configured to (1) receive a routing control packet from a neighbor node of the target node, the routing control packet including a first link quality, the first link quality being a link quality of a path from the neighbor node to a source node, the source node being a node configured to transmit the routing control packet, (2) acquire a third link quality according to a second link quality and the first link quality, the second link quality being a link quality of a path from the target node to the neighbor node, the third link quality being a link quality of a path from the target node to the source node, and (3) determine time to live of the path from the target node to the source node according to the third link quality.

In some example embodiments, the one or more processors may be further configured to update the first link quality in the routing control packet with the third link quality, and transmit the updated routing control packet to other neighbor nodes of the node than the neighbor node so that arbitrary nodes of the other neighbor nodes may determine time to live values of a path from the arbitrary nodes to the source node transmitting the routing control packet based on the received routing control packet.

In some example embodiments, the one or more processors may be further configured to compare the determined time to live with second desired (or alternatively, predetermined or threshold) time to live, namely judge whether the determined time to live is longer than the second desired (or alternatively, predetermined or threshold) time to live.

In some example embodiments, the one or more processors may be further configured to update the time to live of the path in the local routing table of the node with the determined time to live, when the determined time to live is longer than the second desired (or alternatively, predetermined) time to live.

The routing link network may include, for example, a link state routing mode and a distance vector routing mode. In the link state routing mode, a node knows all the nodes on the path from the node to the source node transmitting the routing control packet. In the distance vector routing mode, a node does not know all the nodes on the path from the node to the source node transmitting the routing control packet, instead the node only knows a next hop node in the path from the node to the source node transmitting the routing control packet.

With respect to characteristics of the above two route modes, paths from the node to the source node transmitting the routing control packet, which is included in the local routing table of the node, may be different.

In one example, with respect to the link state routing mode, the local routing table of the node may not only include the time to live of the path, but also include a path table. As an example, the path table can be used to record the path from the node to the source node transmitting the routing control packet. The path table stores all the nodes on the path from the node to the source node transmitting the routing control packet.

In this case, the routing control packet not only includes the first link quality, but also a routing table, and the routing table is used to record a path from the neighbor node to the source node transmitting the routing control packet. Accordingly, and an apparatus for a node to determine time to live of a path according to an example embodiment of the present disclosure may further include a path determining unit, configured to determine a path from the node to the source node transmitting the routing control packet.

For example, after receiving the routing control packet from the neighbor node, the path determining unit may add the node into the routing table so as to acquire the path from the node to the source node transmitting the routing control packet, and then store the acquired path into the path table of the local routing table of the node.

In another example, with respect to the distance vector routing mode, at this time, the local routing table of the node may not only include the time to live of the path, but also include a next hop node from the node to the source node transmitting the routing control packet.

In this case, an apparatus for a node to determine time to live of a path according to an example embodiment of the present disclosure may further include a node determining unit, which is configured to determine the next hop node in the path from the node to the source node transmitting the routing control packet.

For example, after receiving the routing control packet from the neighbor node, the node determining unit may take the neighbor node as the next hop node in the path from the node to the source node transmitting the routing control packet, and add the next hop node into the local routing table of the node.

Further, a method for a node to determine time to live of a path according to an example embodiment of the present disclosure may be implemented as a computer code in a computer readable recording medium. Those skilled in the art may implement the computer code to perform the above methods. When the computer code is performed by a computer, the above method of the present disclosure is implemented.

Further, respective units in an apparatus for a node to determine time to live of a path according to an example embodiment of the present disclosure may be implemented as hardware, or combinations of hardware and software. Some example embodiments of the inventive concepts can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments according to example embodiments of inventive concepts can be construed by programmers having ordinary skill in the art to which example embodiments of inventive concepts pertain. Those skilled in the art may implement the respective units by hardware, firmware, hardware executing software or any combination thereof. When some of the respective units is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform corresponding defined process(es). CPUs, DSPs, ASICs and FPGAs may generally be referred to as processors and/or microprocessors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion.

The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa The above methods and/or apparatus for the node to determine the time to live of the path may determine the time to live of the path according to the link quality of the path so that the determined time to live of the path has an improved accuracy, thereby reducing a time delay and/or a packet loss rate of a routing algorithm, and contributing to ensuring a performance and stability of the routing algorithm.

Although the present disclosure has been particularly shown and described with reference to some example embodiments thereof, it shall be understood by those skilled in the art that various changes in form and details may be made therein without departing from the spirit and scope of the present disclosure as defined by the following claims.

What is claimed is:

1. A method for determining time to live of a path of a target node, the method comprising:

receiving a routing control packet from a neighbor node of the target node, the routing control packet including a first link quality, the first link quality being a link quality of a path from the neighbor node to a source node, the source node being a node configured to transmit the routing control packet;

acquiring a third link quality according to a second link quality and the first link quality, the second link quality being a link quality of a path from the target node to the neighbor node, the third link quality being a link quality of a path from the target node to the source node;

determining the time to live of the path from the target node to the source node according to the third link quality; and performing routing of a wireless communication based on the determined time to live.

2. The method of claim 1, further comprising:

updating the first link quality in the routing control packet with the third link quality, and transmitting the updated routing control packet to another neighbor node of the target node.

3. The method of claim 1, wherein the better the third link quality is, the longer the determined time to live is, and the worse the third link quality is, the shorter the determined time to live is.

4. The method of claim 1, wherein the determining the time to live of the path includes determining the time to live of the path from the target node to the source node based on a product of the third link quality and a first time to live.

5. The method of claim 1, further comprising:

updating the time to live of the path in a local routing table of the target node with the determined time to live.

6. The method of claim 5, wherein the updating the time to live of the path includes:

comparing the determined time to live with a second time to live, wherein when the determined time to live is greater than the second time to live, the time to live of the path in the local routing table of the target node is updated with the determined time to live.

7. The method of claim 6, wherein when the determined time to live is not greater than the second time to live, the time to live of the path in the local routing table of the target node is updated with the second time to live.

8. The method of claim 1, wherein the acquiring a third link quality includes acquiring the third link quality based on the second link quality and the first link quality through an operation.

9. The method of claim 8, wherein the operation includes at least one of addition or multiplication.

10. The method of claim 1, wherein the third link quality is inversely proportional to a number of nodes included in, the path from the target node to the source node.

11. A method for performing routing of a wireless communication, the method comprising:

receiving a routing control packet from a neighbor node of a target node, the routing control packet including a first link quality, the first link quality being a link quality of a path from the neighbor node to a source node, the source node being a node configured to transmit the routing control packet;

acquiring a third link quality according to a second link quality and the first link quality, the second link quality being a link quality of a path from the target node to the neighbor node, the third link quality being a link quality of a path from the target node to the source node; and determining a time to live of the path from the target node to the source node according to the third link quality based on a product of the third link quality and a first threshold time to live.

12. The method of claim 11, further comprising:

updating the routing control packet by replacing the first link quality included therein with the third link quality; and transmitting the updated routing control packet to another neighbor node of the target node.

13. The method of claim 11, further comprising:

empirically setting the first threshold time to live.

14. The method of claim 11, further comprising:

updating the time to live of the path in a local routing table of the target node with the determined time to live.

15. The method of claim 14, wherein the updating the time to live of the path includes comparing the determined time to live with a second threshold time to live.

16. The method of claim 15, further comprising:

empirically setting the second threshold time to live.

17. The method of claim 16, wherein when the determined time to live is greater than the second threshold time to live, the time to live of the path in the local routing table of the target node is updated with the determined time to live.

18. The method of claim 16, wherein when the determined time to live is not greater than the second threshold time to live, updating the time to live of the path in the local routing table of the target node with the second time to live.

19. The method of claim 11, wherein the acquiring a third link quality includes acquiring the third link quality based on the second link quality and the first link quality through at least one of addition or multiplication.

20. The method of claim 11, wherein the third link quality is inversely proportional to a number of nodes included in the path from the target node to the source node.

* * * * *